US005398010A

United States Patent [19]

Klebe

[11] Patent Number: 5,398,010

[45] Date of Patent: Mar. 14, 1995

[54] MOLDED WAVEGUIDE COMPONENTS HAVING ELECTROLESS PLATED THERMOPLASTIC MEMBERS

[75] Inventor: Douglas O. Klebe, Los Angeles, Calif.

[73] Assignee: Hughes Aircraft Company, Los Angeles, Calif.

[21] Appl. No.: 880,123

[22] Filed: May 7, 1992

[51] Int. Cl.⁶ .......................... H01P 3/12; B32B 31/14

[52] U.S. Cl. .......................... 333/239; 333/248; 29/600; 156/150; 156/292

[58] Field of Search .............. 333/239, 248, 241, 242; 156/304.2, 242, 245, 150, 292; 29/600; 138/139, 143, 145, 151, 157, 171

[56] References Cited

U.S. PATENT DOCUMENTS

| | | | |
|---|---|---|---|
| 2,822,524 | 2/1958 | Williston | 333/239 |
| 3,157,847 | 11/1964 | Williams | 333/239 |
| 3,195,079 | 7/1965 | Burton et al. | 333/239 |
| 3,337,822 | 8/1967 | Hahne | 333/239 |

FOREIGN PATENT DOCUMENTS

| | | | |
|---|---|---|---|
| 1346490 | 11/1963 | France | 333/239 |
| 751385 | 6/1956 | United Kingdom | 333/239 |
| 758457 | 10/1956 | United Kingdom | 333/239 |

*Primary Examiner*—Benny T. Lee

*Attorney, Agent, or Firm*—Leonard A. Alkov; W. K. Denson-Low

[57] ABSTRACT

A microwave assembly having molded thermoplastic components that are first assembled into an enclosure, and then electroless copper plated to provide for RF conductivity. Assemblies are made by bonding bare thermoplastic components, after which the bonded assembly is electroless copper plated. The components are made of an injection molding material, polyetherimide, or a high strength, high temperature thermoplastic. The components are assembled using a one component epoxy adhesive, for example. All components are designed to be self locating to aid in assembly. A bonding fixture is used to apply clamping pressure to the components while the adhesive cures. After bonding, the waveguide assembly has its critical flange surfaces finish machined prior to plating.

5 Claims, 3 Drawing Sheets

MOLDED WAVEGUIDE COMPONENTS HAVING ELECTROLESS PLATED THERMOPLASTIC MEMBERS

CROSS REFERENCE TO RELATED APPLICATIONS

Reference is made to U.S. patent application Ser. No. 07/880,122, filed May 7, 1992, for "Molded Metallized Microwave Components and Processes for Manufacture," now abandoned in favor of continuation U.S. patent application Ser. No. 08/243605, filed May 16, 1994, which is assigned to the assignee of the present invention.

BACKGROUND

The present invention relates generally to microwave waveguide components, and more particularly, to waveguide components that are fabricated from metallized, molded thermoplastic.

For microwave applications, waveguides and waveguide assemblies are generally fabricated from metal. Specific standards for commonly used metallic alloys and standards for configurations regarding rigid rectangular waveguides, including brazing and fabrication methods, are available through the United States National Bureau of Standards. Another source of such information is the American Standards of Test and Materials available through the American Society of Mechanical Engineers (ASME). The most commonly used metallic materials are aluminum alloys (alloy numbers 1100, 6061, and 6063 per ASTM B210 and cast brazable alloys such as 712.0,40E, and D612 per QQ-A-601), magnesium alloy (alloy AZ31B per ASTM B107), copper alloys (per ASTM B372 and MIL-S-13282), silver alloy (grade C per MIL-S-13282), silver-lined copper alloy (grade C per MIL-S-13282), and copper-clad Invar. These materials may be divided into two classes—rigid and flexible. The rigid materials are either wrought, drawn, cast, electroformed, or extruded, while the flexible materials consist of convoluted tubing. If these materials are not formed to net shape, they are either machined to shape (when all features are accessible) or broken down into individual details and joined together to form complex assemblies.

Additional information regarding rigid rectangular waveguides can be found in MIL-W-85G, while rigid straight, 90 degree step twist, and 45-, 60-, and 90-degree E and H plane bend and mitered corner waveguide parameters are given in MIL-W-3970C. ASTM B102 covers magnesium alloy extruded bars, rods, shapes, and tubes. Aluminum alloy drawn seamless tubes and seamless copper and copper-alloy rectangular waveguide tubes are discussed in ASTM B210 and ASTM B372, respectively. Waveguide brazing methods are given in MIL-B-7883B, while electro forming is discussed in MIL-C-14550B. It is in the fabrication of complex shapes that the disadvantages of metallic waveguides become most apparent.

Typically, conventional waveguide components are individually machined metal parts that have a relatively high raw material costs, are relatively heavy, and have a relatively long fabrication time. The metal components have each feature machined one at a time. The RF performance of conventional machined parts, such as dip brazed aluminum assemblies is unpredictable. The high temperatures encountered during the brazing process cause unpredictable distortions in the RF microwave features. This degrades the performance obtained from the finished metal assemblies.

Regarding the existing state of the art in molded thermoplastic waveguide components, reference is made to U.S. Pat. No. 4,499,157, entitled "Solderable Plated Plastic Components and Processes for Manufacture and Soldering," owned by the assignee of the present invention. This patent discloses waveguide components that are fabricated by electroplating molded waveguide components and thereafter assembling them using a tin-lead soldering process.

SUMMARY OF THE INVENTION

The present invention comprises a microwave assembly having thermoplastic components that are first molded, and the molded parts are then assembled into an enclosure, and then the assembled enclosure is electroless copper plated to provide a finished assembly. The microwave components of the present invention are assembled by bonding bare plastic subassemblies, and then the bonded subassemblies are electroless copper plated into a finished assembly. Assembling the microwave components prior to plating eliminates the requirement of a conductive joint, which plays an important part in the performance of the completed microwave assembly.

More particularly, the present invention provides for molded microwave waveguide component that comprise a plurality of joinable thermoplastic members having predefined shapes and sizes that are joinable and that are coupled together to form an enclosure. The enclosure has an internal electroless copper plated surface, and the enclosure forms a microwave waveguide that is adapted to transmit microwave energy.

More specifically, the plurality of joinable thermoplastic members comprise a center feed assembly that includes the following components: a lower transition having a plurality of slots disposed therein and a plurality of ridges disposed on an inner surface thereof; an upper transition disposed adjacent to the lower transition and having a plurality of ridges disposed on an inner surface thereof; a folded slot, transverse waveguide cover disposed over the upper transition; and an input cover disposed over an input section of the folded slot, transverse waveguide cover. The enclosure is bonded typically together by means of epoxy adhesive cured. The enclosure also may be coated with polyimide subsequent to plating. Furthermore, the enclosure is typically vacuum cured to finalize its fabrication.

The molded waveguide components of the present invention use an injection molding material such as Ultem 2300 or 2310 (a registered trademark of Shipley Company, Incorporated), polyetherimide, or any suitable high strength, high temperature thermoplastic. The microwave components are molded, after which they are assembled, using epoxy adhesives and solvents or any suitable processing method. These assemblies are then electroless copper plated to provide for RF conductivity. The finished assemblies are used as a completed RF component or assembly and replaces heavier more costly metal devices.

The use of the microwave components of the present invention results in better performance, lighter weight, and much lower component costs. The concepts of the present invention may be applied to new and existing commercial or military microwave antenna applications. The advantages to the molded waveguide components of the present invention are many. Molded thermoplastic components replace individually machined metal components and thus provide for lower cost. The cost of the molded components is much lower because of lower raw material costs and dramatically shortened fabrication time, since waveguide details are simultaneously reproduced during the molding operation.

Thermoplastics, which are suitable for this application, are typically 30 to 50% lighter for a given volume than aluminum. This allows the finished microwave assembly to be lighter, reducing the total radar set weight. Bonding before plating reduces the performance penalty of a possible high loss assembly joint, thus providing for better performance. A lower dollar investment at the manufacturing level reduces in process scrap costs. Superior RF performance is achievable when compared to similar dip brazed aluminum assemblies. The high temperatures encountered during the brazing process cause unpredictable distortions in the RF microwave features. This degrades the performance obtained from the finished assembly. The molded waveguide concept eliminates these heat related distortions and the resulting RF performance matches the original design expectations.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
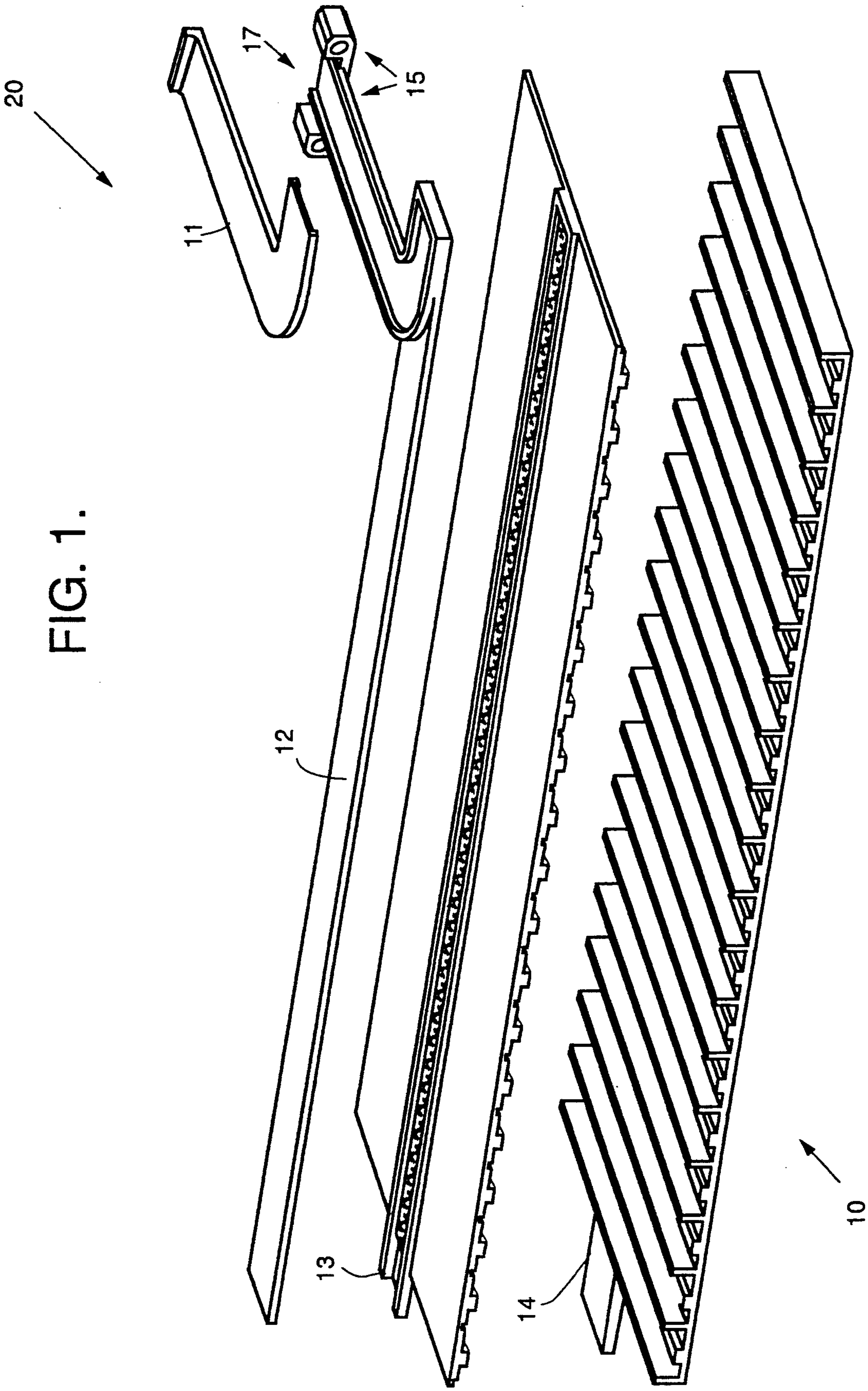
FIG. 1 shows a molded center feed assembly made in accordance with the principles of the present invention.
Figure 2:
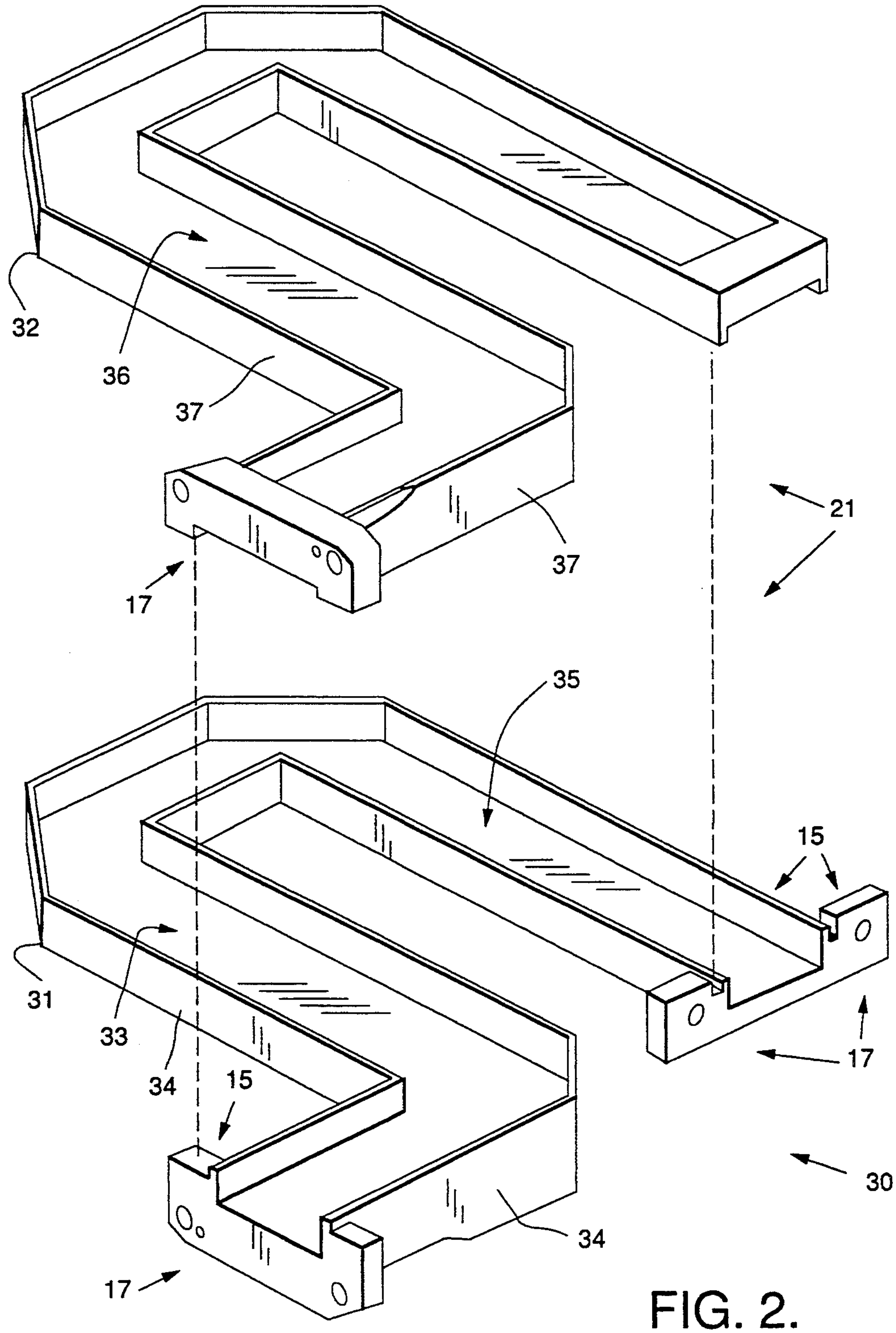
FIG. 2 shows a molded interconnecting waveguide assembly made in accordance with the principles of the present invention.

Referring to the drawing figures, FIG. 1 shows a representative molded center feed assembly 10 of a microwave waveguide made in accordance with the principles of the present invention, while FIG. 2 shows a molded interconnecting waveguide assembly 30 made in accordance with the principles of the present invention. The molded waveguide components typically comprise two basic components, and each component has a variety of configurations that are fabricated for use in in a particular microwave antenna, or power divider, for example. These two basic components are the center feed assembly 10 and the interconnecting waveguide assembly 30. The interconnection of these basic components in their various configurations may be applied to almost any microwave device.

With reference to FIG. 1, the center feed assembly 10 is the more complicated of the two assemblies with regards to its fabrication and function. The center feed assembly 10 comprises four subcomponents, or details, and include an input cover 11, a folded slot, transverse waveguide cover 12, an upper transition 13 and a lower transition 14. The input cover 11, folded slot, transverse waveguide cover 12, upper transition 13 and lower transition 14 are also hereinafter referred to as center feed assembly components 20 (FIG. 1). The center feed assembly 10 is assembled using the four molded details by bonding, and finished dimensions of the bonded unit are such that the assembly 10 will thereafter be electroless copper plated resulting in final overall desired dimensions.

The bonding operation uses epoxy adhesive 15 to join the input cover 11, folded slot 12, upper transition 13 and lower transition 14 together. The bond lines between each of the center feed assembly components 20 and the location of the epoxy adhesive 15 is shown by arrows in FIG. 1. The center feed assembly components 20 are typically designed so that the molded details self locate, aiding in the assembly operation. A bonding fixture (not shown) is used to apply clamping pressure to the four center feed assembly components 20, while the epoxy adhesive 15 is cured at about 300° F. for about 45 minutes. After bonding, the bonding fixture is disassembled and the center feed assembly 10 has its critical flange surfaces 17 finish machined. Once critical flange surfaces 17 have been properly machined to meet requirements, the fully assembled center feed assembly 10 is ready for electroless copper plating. This plating process is an electroless copper plating process adapted for Ultem 2300 or 2310 thermoplastic (a registered trademark of Shipley Company, Incoporated).

The electroless copper plating process helps to make the present invention unique. The plating is applied to the finished microwave waveguide assembly subsequent to fabrication. This process allows complex components, like the center feed assembly 10, to be plated after assembly. This removes the problems associated with using a secondary conductive method (as in conventional soldering processes) to make the final assembly and align the critical flange surfaces 17.

With reference to FIG. 2, the interconnecting waveguide assembly 30 comprises an assembly similar to the center feed assembly 10, but is much simpler in design and construction. There are four configurations of the waveguide assembly 30 and each configuration is molded in two halves and assembled. FIG. 2 shows two such halves of one such configuration, comprising a base 31 and a cover 32. The base 31 and cover 32 are also hereinafter referred to as interconnecting waveguide assembly components 21. The base 31 is shown as a U-shaped member having a sidewall 33 and a plurality of edgewalls 34 contacting the sidewall 33 to form a U-shaped cavity 35. The cover 32 is also shown as a U-shaped member that is adapted to mate with the base 31, and has a sidewall 36 and a plurality of edgewalls 37 contacting the sidewall 36.

The waveguide assembly 30 is assembled by bonding the two molded halves comprising the base 31 and the cover 32 together. The bonding operation uses the one component epoxy adhesive 15 to join the base 31 and cover 32 together. These components are also designed such that the parts self locate to aid in the assembly operation. The bonding fixture is used to apply clamping pressure to the base 31 and cover 32 while the adhesive 15 is cured at about 300° F. for about 45 minutes. After bonding, the bonding fixture is disassembled and the waveguide assembly 30 has its critical flange surfaces 17 finish machined. When the critical surfaces 17 meet requirements the waveguide assembly 30 is then ready for electroless copper plating as was described above with reference to the center feed assembly 10.

Injection mold tooling has been fabricated to mold the thermoplastic components that make up the center feed and interconnecting waveguide assemblies 10, 30. The various components have been assembled and tested to the same requirements as current metal production parts, and better performance has been demonstrated. Molded center feeds and interconnecting waveguide assemblies 10, 30 have been subjected to extensive environmental and vibration testing and finished assemblies 10, 30 have passed all tests without any failure.

Figure 3:
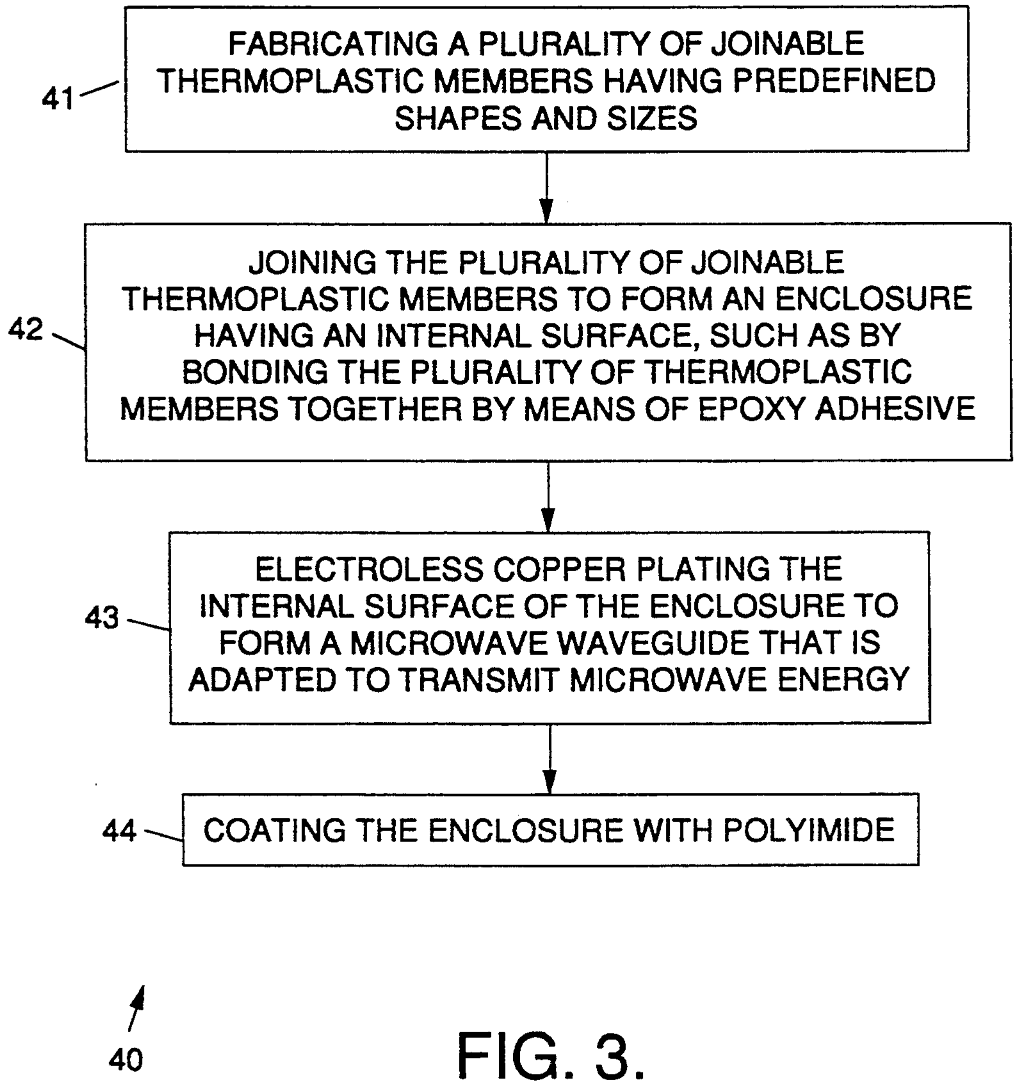
FIG. 3 shows an exemplary process of fabricating a molded microwave waveguide component in accordance with the principles of the present invention.

With reference to FIG. 3, the molded waveguide fabrication process 40 used in making the molded waveguide components of the present invention comprises the following steps. The center feed assembly components 20 and interconnecting waveguide assembly components 21 are fabricated (step 41), such as by injection molding, using a high strength, high temperature thermoplastic, such as Ultem 2300 or 2310 thermoplastic, available from General Electric Company, Plastics Division. Secondary machining of the center feed assembly components 20 of the center feed assembly 10 is preformed. The center feed assembly components 20 are then assembled or joined (step 42), such as by using the epoxy adhesive 15, such as Hysol Dexter Corporation type EA9459, for example, and then the assembly is cured at 300° F. for about 45 minutes. Then, the critical flange surfaces 17 are finish machined. The bonded center feed waveguide assembly 10 is then electroless copper plated (step 43) (0.0002 to 0.0003 inches thick) and the flanges 17 are burnished. Terminating loads (not shown) and a load cover (not shown) disposed on the rear edge of the center feed assembly 10, as viewed in FIG. 2, are installed. The copper plated center feed assembly 10 is then coated (step 44) with polyimide, and then it is vacuum cured at about 250° F. for about 60 minutes. An electrical acceptance test is then performed to ensure proper electrical performance of the center feed assembly 10.

The electroless copper plating process for injection molded glass reinforced Ultem surfaces is performed as follows. The plating process is controlled by using a conventional Ultem electroless copper plating solution make-up and control, and conventional Ultem electroless copper plating, available from Shipley Company, Incorporated (hereinafter "Shipley"). The center feed and interconnecting waveguide assemblies 10, 30 are cleaned and degreased using Oakite 166 (a registered trademark of Oakite Products, Inc.), available from Oakite Products, Inc. at 150° F. The center feed and interconnecting waveguide assemblies 10, 30 are conditioned using XP-9010 at 125° F., available from Shipley. The center feed and interconnecting waveguide assemblies 10, 30 are dipped in sodium permanganate CDE-1000, available from Enthone, at 170° F. Alternatively, chromic acid or potassium permanganate, for example, may be employed in this step. The center feed and interconnecting waveguide assemblies 10, 30 are dipped in a neutralizer CDE-1000 at 130° F. The center feed and interconnecting waveguide assemblies 10, 30 are etched at ambient temperature. The etched center feed and interconnecting waveguide assembly assemblies 10, 30 are dipped in a solution of Cataprep 404 (a registered trademark of Shipley Company, Incorporated), available from Shipley at 100° F. The center feed and interconnecting waveguide assemblies 10, 30 are then dipped in a solution of Cataposit 44 (a registered trademark of Shipley Company, Incorporated), available from Shipley at 100° F. The etched center feed and interconnecting waveguide assemblies 10, 30 are dipped in a solution comprising Accelerator 19 available from Shipley at ambient temperature. A copper flashing is applied to the center feed and interconnecting waveguide assemblies 10, 30 using Copper Strike 328 ABC (a registered trademark of Shipley Company, Incorporated), for example, available from Shipley, at ambient temperature. A heavy copper deposition using XP-8835, manufactured by Shipley, at 160° F. is then applied to the center feed and interconnecting waveguide assembly assemblies 10, 30. Finally, the plated center feed and interconnecting waveguide assemblies 10, 30 are air dried.

Thus there has been described new and improved waveguide components that are fabricated from metallized, molded thermoplastic. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A molded microwave waveguide component comprising:

a plurality of thermoplastic members having predefined shapes and sizes bonded with epoxy adhesive to define an enclosure, and wherein the enclosure has an internal electroless copper plated surface that is plated into a finished assembly in the fabrication thereof, and having a polyimide coating disposed over the copper plated surface, wherein the enclosure defining a microwave waveguide that is capable of transmitting microwave energy.

2. A molded microwave waveguide component fabricated by the process steps comprising:

fabricating a plurality of joinable thermoplastic members having predefined shapes and sizes;

joining the plurality of joinable thermoplastic members to form an enclosure having an internal surface by bonding the plurality of thermoplastic members together by means of epoxy adhesive;

electroless copper plating the internal surface of the enclosure to form a microwave waveguide that is capable of transmitting microwave energy;

coating the enclosure with polyimide that is disposed over the copper plated internal surface.

3. A molded microwave waveguide component comprising:

a plurality of thermoplastic members having predefined shapes and sizes that are coupled together to define an enclosure, and wherein the enclosure has an internal electroless copper plated surface that is plated into a finished assembly in fabrication thereof, the enclosure defining a microwave waveguide that is capable of transmitting microwave energy, wherein the plurality of thermoplastic members comprise an interconnecting waveguide assembly that comprise a base and a mating cover, the base comprising a U-shaped member having a sidewall and a plurality of edgewalls contacting the sidewall to define a U-shaped cavity thereof, the cover comprising a U-shaped member that mates with the base, and having a sidewall and a plurality of edgewalls contacting the sidewall to define a U-shaped cavity thereof, and wherein the base and mating cover are coupled together to define the enclosure, and wherein inner surfaces thereof are electroless copper plated to define the enclosure, and the enclosure having a polyimide coating disposed over the internal electoless copper plated surface.

4. A molded microwave waveguide component comprising:

a plurality of thermoplastic members having predefined shapes and sizes that are coupled together to define an enclosure, and wherein the enclosure has an internal electroless copper plated surface that is plated into a finished assembly in fabrication thereof, the enclosure defining a microwave waveguide that is capable of transmitting microwave energy, wherein the plurality of thermoplastic members comprise a center feed assembly that comprises a lower transition member having a plurality of slots disposed therein and a plurality of ridges disposed on an inner surface thereof, an upper transition member disposed adjacent to the lower transition section and having a plurality of ridges disposed on an inner surface thereof, a folded slot, transverse waveguide cover disposed over the upper transition member, and an input cover disposed over an input section of the folded slot, a transverse waveguide cover, and wherein the lower transition member, the upper transition member, the waveguide cover, and the input cover are coupled together to define the enclosure, and wherein the inner surfaces of the upper and lower transition members and inner surfaces of the waveguide and input covers are electroless copper plated to define the enclosure.

5. The molded microwave waveguide component of claim 4 which further comprises a polyimide coating disposed over the copper plated surface.

* * * * *